(12) United States Patent
Kokichi

(10) Patent No.: US 8,064,153 B2
(45) Date of Patent: Nov. 22, 2011

(54) LENS DRIVING DEVICE

(75) Inventor: Terajima Kokichi, Tokyo (JP)

(73) Assignees: Micro Win Tech Inc., Tokyo (JP); Largan Precision Co., Ltd., Taichung (TW); Terajima Kokichi, Tokyo (JP)

( * ) Notice: Subject to any disclaimer, the term of this patent is extended or adjusted under 35 U.S.C. 154(b) by 79 days.

(21) Appl. No.: 12/662,919

(22) Filed: May 12, 2010

(65) Prior Publication Data

US 2011/0058268 A1 Mar. 10, 2011

(30) Foreign Application Priority Data

Sep. 8, 2009 (JP) ................................. 2009-207460

(51) Int. Cl.
*G02B 7/02* (2006.01)
(52) U.S. Cl. ........................................ 359/824; 359/694
(58) Field of Classification Search .................. 359/824, 359/694
See application file for complete search history.

(56) References Cited

U.S. PATENT DOCUMENTS 7,729,069 B2 * 6/2010 Chang ............................ 359/824
2008/0069557 A1 * 3/2008 Ishizawa et al. ............... 396/529

FOREIGN PATENT DOCUMENTS

JP 2004 280031 A 10/2004

* cited by examiner

*Primary Examiner* — Ricky Mack
*Assistant Examiner* — James Jones
(74) *Attorney, Agent, or Firm* — Bacon & Thomas, PLLC

(57) ABSTRACT

This invention provides a lens driving device with a driving coil connected thereto that can avoid possible damages on the ends of the driving coil and any adverse effect on the spring members or the lens holder. When the ends of the driving coil are connected to the electric terminals mounted on a casing respectively, the coiling pull start section of the driving coil which begins from the beginning end of the driving coil to the electric terminal and the coiling pull finish section of the driving coil which begins from the finish end of the driving coil to the electric terminal are made into L-shaped structures. Such L-shaped structure comprises a lens holder lateral section extending horizontally and a terminal lateral section extending vertically.

12 Claims, 12 Drawing Sheets

(a)

(b)

LENS DRIVING DEVICE

FIELD OF THE INVENTION

The present invention relates to a voice-coil-motor driven lens driving device used in a camera and, more particularly, to a structure in which the ends of a driving coil mounted on the movable side are connected to the fixed side.

DESCRIPTION OF RELATED ART

In recent years, the increase in pixel number of an image sensor for the camera equipped in the mobile device is gradually improving the quality of captured images. Along with such tendency, the lens system equipped in such devices is modified from conventional fixed-focal type camera modules to vari-focal type camera modules. This is because the fixed-focal type camera modules may suffer encounter serious out-of-focus problem and consequently fail to support the resolution performance of the image sensor with a large amount of pixels.

A conventional lens driving device installed with a voice coil motor is generally used to implement the driving scheme of the lens system in the vari-focus type camera module.

FIG. 10 shows a cross-section structural diagram of a prior art lens driving device 50 driven by a voice-coil-motor. The lens driving device 50 comprises: a yoke 51 made of magnetic substances, such as soft iron, with an U-shaped cross-section, a cylindrical permanent magnet 52 mounted on an inner sidewall of the yoke 51, a lens holder 54 for holding at least one lens 53 at a center position, a driving coil 55 mounted on the lens holder 54, a casing 56 whose inner circumference is mounted with the yoke 51, and an upper plate spring member 57A and a lower plate spring member 57B connecting the lens holder 54 and the casing 56 (Please refer to Patent Document 1).

As shown in FIG. 11, the upper plate spring member 57A comprises: an inner circular section 57a connected to the lens holder 54, an outer circular section 57b connected to the casing 56 indicated in FIG. 10, and a wrist section 57c connecting the inner circular section 57a to the outer circular section 57b. The wrist section 57c is used as a spring element. The lower plate spring member 57B indicated in FIG. 10 is of similar structure.

As shown in FIG. 10, the driving coil 55 is placed in a radially-distributed magnetic field applied by the yoke 51 and the permanent magnet 52. Therefore, when the driving coil 55 is powered, a Lorentz force will be generated in a direction (indicated by an arrow Z in FIG. 10) toward the imaged-object, thereby moving the lens holder 54 to a position where the Lorentz force and the restoring force of the plate spring members 57A and 57B are in equilibrium.

Thus, by controlling the current flowing through the driving coil 55, the displacement of the lens holder 54 or, more specifically, the position of the lens 53 can be controlled.

The plate spring members 57A and 57B are metallic conductors made of metals or alloys. In the lens driving device 50, the ends $55k$ and $55l$ of the driving coil 55 are connected to the wires connecting to a driving power source (not shown) through the conductive plate spring members 57A, 57B so as to power the driving coil 55.

More specifically, as shown in FIG. 11 and FIG. 12, the beginning end $55k$ of the driving coil 55 on the lens holder 54 is pulled through the gap $57s$ between the inner circular section $57a$ and the wrist section $57c$ of the plate spring member 57A and then soldered to the soldering section 57P shown in FIG. 12, the inner circular section $57a$ or the area proximate to the bottom section $57d$ of the wrist section $57c$.

The method illustrated above is employed to connect the finish end $55l$ to the plate spring member 57B.

Patent Document 1: JP 2004-280031

However, the gap between the inner circular section $57a$ and the wrist section $57c$ of the plate spring members 57A, 57B is only 100~150 µm, and the diameter of the driving coil 55 is only 50 µm, which is very small. Thus, when the ends $55k$, $55l$ of the driving coil 55 are to be inserted through the gap $57s$ between the inner circular section $57a$ and the wrist section $57c$ of the plate spring members 57A, 57B, it requires meticulous operation to avoid damaging the ends of the driving coil. As a result, the device operation prolongs, sometimes damage occurs on the ends $55k$, $55l$ of the driving coil 55, and the insulating cover of the driving coil 55 is lifted.

In addition, the heat of the soldering iron will be dissipated to the wrist section $57c$ of the plate spring members 57A, 57B. This will cause deterioration of the spring. Furthermore, as the connecting point of the soldering section 57P is in close proximity of the lens holder 54, the lens holder 54 could be melt.

In the light of the drawback in the prior art, the present invention aims to provide a lens driving device with a driving coil connected thereto, and the arrangement thereof will neither damage the ends of the driving coil nor cause negative effects on the spring members or the lens holder.

BRIEF DESCRIPTION OF THE INVENTION

The present invention provides a lens driving device, comprising: a lens holder as a movable component moving along an axis in an upward-downward direction; a set of electric terminals installed on the fixed side components; a driving coil installed on an outer sidewall of the aforementioned lens holder, the ends thereof being connected to the aforementioned set of electric terminals; a coiling pull start section of the aforementioned driving coil starting from the beginning end of the aforementioned driving coil to one of the aforementioned set of electric terminals; a coiling pull finish section of the aforementioned driving coil starting from the finish end of the aforementioned driving coil to one of the aforementioned set of electric terminals; a lens holder lateral section of the aforementioned driving coil extending outward horizontally from the aforementioned beginning or finish end of the aforementioned driving coil; and a terminal lateral section of the aforementioned driving coil extending outward from an end of the aforementioned lens holder lateral section in a direction intersecting with the extending direction of the aforementioned lens holder lateral section.

In addition, when the upward-downward direction is in the z-axis direction, the forward-backward direction is in the x-axis direction, and the leftward-rightward direction is in the y-axis direction, the present invention is not limited to the arrangement that "as the aforementioned lens holder lateral section is within the xy plane, the aforementioned terminal lateral section extends upward in a direction intersecting with the xy plane", and may include the arrangement of "within the xy plane and extending upward in a direction intersecting with the extending direction of the aforementioned lens holder lateral section".

Therefore, even though pressing force or tension triggered by the rotation of the moving lens holder acts upon the beginning end or the finish end of the driving coil, the pressing force or tension can be absorbed with the flexure of the coiling pull start section or the coiling pull finish section, thereby smoothly moving the lens holder.

Also, due to the connection of the ends of the driving coil to the electric terminals on the fixed side components, damages on the ends of the driving coil can be avoided, and the problem concerning the deterioration of the spring members or the melting of the lens holder caused by the heat of the soldering iron can be significantly mitigated, thereby enabling stable operation of the lens driving device.

In addition, in the present invention, the extending directions of the aforementioned lens holder lateral section and terminal lateral section are mutually perpendicular.

Thus, the flexure of the terminal lateral section becomes even, enabling the pressing force or tension to be absorbed.

Moreover, in the present invention, the ends of the coiling pull start section and the coiling pull finish section of the aforementioned driving coil are connected to the aforementioned electric terminals through the means of welding. Therefore, the connection between the electric terminals and the driving coil is secure and this extends the service life of the device.

Furthermore, in the present invention, each of the aforementioned electric terminals comprises: a wrist section extending from one of the aforementioned fixed side components toward the aforementioned lens holder lateral section, and a connecting piece mounted on the end of the aforementioned wrist section and extending in a direction parallel to the extending direction of the aforementioned terminal lateral section; wherein the ends of the aforementioned coiling pull start section and coiling pull finish section wind around the aforementioned connecting pieces.

As the ends of the driving coil are firmly secured on the electric terminals, the welding or soldering of the electric terminals and the driving coil will become easier. Hence, the electric terminals and the driving coil are firmly secured together.

Furthermore, in the present invention, the end of the aforementioned coiling pull start section winding around the aforementioned connecting pieces and the aforementioned electric terminal are covered by resin materials.

Therefore, the aforementioned terminal lateral section will not be in contact with the aforementioned electric terminal when the lens holder is in motion, and further possible damage to the driving coil can also be prevented.

Moreover, in the foregoing paragraphs, not all required elements of the present invention are listed, and the sub-combinations of these elements could also be represented by the present invention.

DETAILED DESCRIPTION OF THE INVENTION

The present invention will now be described with detailed embodiments. The following embodiments are not intended to confine the invention relevant to the scope of claims. Also, all combinations of the features described in the embodiments are not necessarily the sole solutions of the present invention.

First Embodiment

Figure 1:
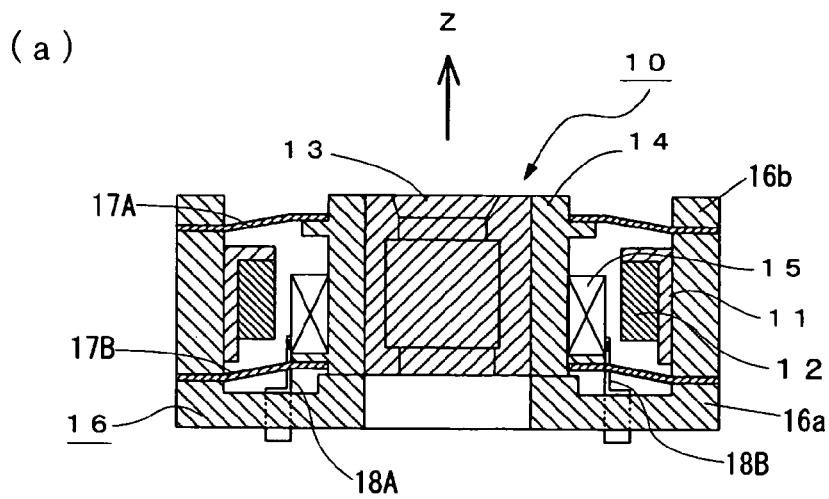
FIG. 1 is a structural view of a lens driving device in accordance with an embodiment of the present invention.
Figure 1:
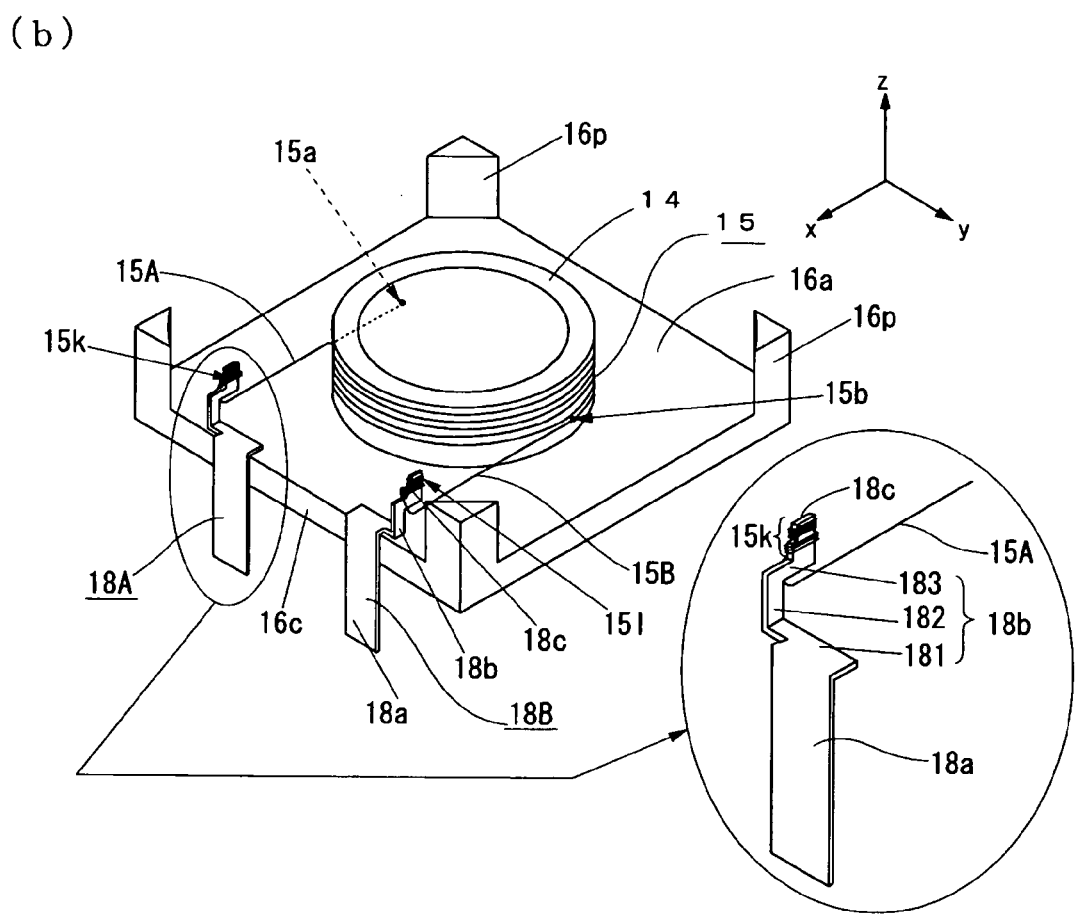

FIGS. 1$a$, 1$b$ are structural diagrams of the lens driving device 10 in accordance with an embodiment of the present invention. FIG. 1$a$ is a cross-section of the whole device, and FIG. 1$b$ is a 3D diagram showing important elements of the electric terminals connecting to the driving coil.

The lens driving device 10 comprises: a yoke 11 made of magnetic substances, such as soft iron, a permanent magnet 12 mounted on an inner sidewall of the yoke 11, a lens set 13 comprising at least one objective lens and at least one ocular lens, a lens holder 14 for holding the lens set 13 at the center position, a driving coil 15 mounted on an outer sidewall of the lens holder 14, a casing 16 whose inner circumference is provided with the yoke 11, an upper plate spring member 17A and a lower plate spring member 17B connecting the casing 16, the lens holder 14, and electric terminals 18A, 18B. Furthermore, the upward-downward direction of the lens driving device 10 will be referred to as the Z axis direction, and the xy plane is the horizontal plane.

The casing 16, yoke 11, and the permanent magnet 12 are components mounted on the fixed side of the lens driving device 10 of the present invention. The lens set 13, the lens holder 14, and the driving coil 15 are components mounted on the movable side. Moreover, the upper and lower plate spring members 17A, 17B are the connecting pieces between the fixed side and the movable side components.

Furthermore, the section of the driving coil 15 starting from the beginning end 15$a$ of the driving coil 15 to the electric terminal 18A is called the coiling pull start section 15A of the driving coil 15, and the section of the driving coil 15 starting from the finish end 15$b$ of the driving coil 15 to the electric terminal 18B is called the coiling pull finish section 15B of the driving coil 15. The end 15$k$ of the aforementioned coiling pull start section 15A and the end 15$l$ of the coiling pull finish section 15B of the driving coil 15 are two ends of the driving coil 15.

The yoke 11 is a cylindrical component with an L-shaped cross-section made of magnetic materials such as soft iron and placed along the circumference of the lens holder 14 with a preset spacing therebetween.

The permanent magnet 12 is a cylindrical component mounted on the inner sidewall of the yoke 11 and combined with the yoke 11 to impose a magnetic field radially surrounding the driving coil 15.

The lens holder 14 is a cylindrical component for keeping the lens set 13 comprising at least one objective lens and at least one ocular lens in the center position.

The driving coil 15 is mounted on the outer sidewall of the lens holder 14.

The casing 16 comprises a base 16a and a yoke fulcrum 16b extending upward from the periphery of the base 16a. The base 16a is a plate-shaped component which appears to be rectangular when being viewed from above and supports the bottom of the lens holder 14 in static state, and the yoke fulcrum 16b supports the yoke 11 and the permanent magnet 12 mounted on the inner circumferential surface thereof.

The plate spring members 17A, 17B are round-plate springs. The upper plate spring member 17A connects the top portion of the lens holder 14 to the yoke fulcrum 16b of the casing 16; the lower plate spring member 17B is mounted on the bottom of the lens holder 14 and positioned on the top of the spring mounting parts 16p extending from the four corners of the base 16a of the casing 16; and the lower plate spring member 17B connects the lens holder 14 to the casing 16.

The electric terminals 18(18A, 18B) are mounted with a preset spacing therebetween on the lateral side 16c of the base 16a of the casing 16 and located between two spring mounting parts 16p. The electric terminals 18 are connected to the wires connecting to a driving power source (not shown).

The electric terminals 18 are shaped like bent saws, and each of them includes a flat-plated mounting section 18a which is installed on the lateral side 16c of the base 16a, a wrist section 18b extending from the mounting section 18a toward the lens holder 14, and a connecting piece 18c protruding upward from the end of the wrist section 18b. The connecting piece 18c is provided for connecting the end 15k of the coiling pull start section 15A of the driving coil 15 or the end 151 of the coiling pull finish section 15B of the driving coil 15.

In this embodiment, the wrist section 18b includes a horizontal piece 181 extending toward the lens holder 14, a perpendicular piece 182 protruding upward from one end of the horizontal piece 181, and an extended piece 183 extending from one end of the perpendicular piece 182 toward the lens holder 14. One end of the extended piece 183 is provided with the aforementioned connecting piece 18c.

The aforementioned electric terminals 18 can be made by punching or bending metal plates.

Figure 2:
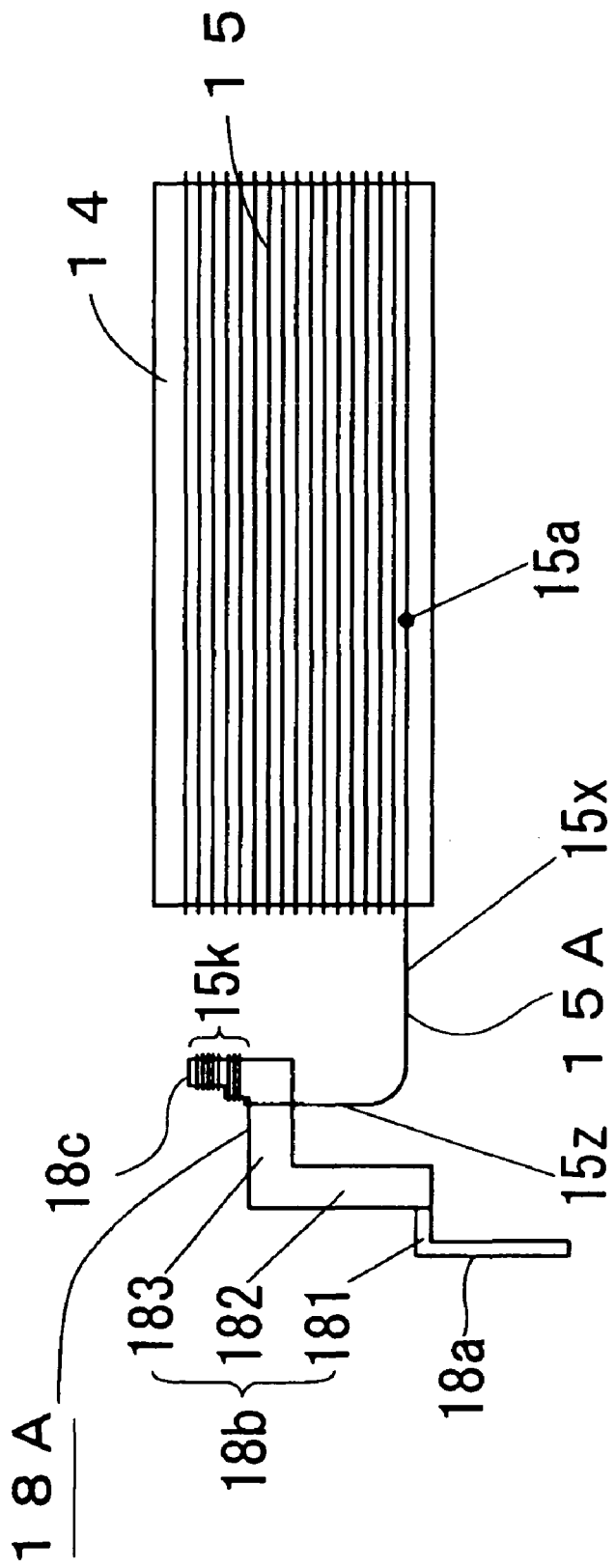
FIG. 2 is a diagram illustrating a connection arrangement between the electric terminals and the ends of the driving coil.

FIG. 2 shows a connection arrangement between the connecting piece 18c of the electric terminal 18A and the end 15k of the coiling pull start section 15A of the driving coil 15. In this embodiment, the coiling pull start section 15A is L-shaped and comprises a lens holder lateral section 15x extending horizontally from the beginning end 15a, and a terminal lateral section 15z extending upward from the lens holder lateral section 15x to the connecting piece 18c of the electric terminal 18A. In addition, the end 15k of the coiling pull start section 15A winds around the connecting piece 18c of the electric terminal 18A so as to connect to the electric terminal 18A.

The same technique is applied to establish a connection between the end 151 of the coiling pull finish section 15B of the driving coil 15 and the electric terminal 18B.

In this embodiment, after the end 15k of the coiling pull start section 15A is wound around the connecting piece 18c of the electric terminal 18A, welding is applied to connect the end 15k of the coiling pull start section 15A of the driving coil 15 and the end 18k of the connecting piece 18c of the electric terminal 18A. The same technique is applied to establish a connection between the end 151 of the coiling pull finish section 15B and the end 181 of the connecting piece 18c of the electric terminal 18B.

Regarding welding, the tungsten inert gas arc welding or plasma arc welding is used to connect the end 15k of the coiling pull start section 15A to the end 18k of the connecting piece 18c and to connect the end 151 of the coiling pull finish section 15B to the other end 181 of the connecting piece 18c, thereby the proximity of the ends 18k, 181 of the connecting pieces 18c and the ends 15k, 151 of the coiling pull start/finish sections 15A, 15B can be welded together within a very short period of time. Thus, the temperature of the electric terminals 18A, 18B will not rise, and the welding area will be able to remain small.

Figure 3:
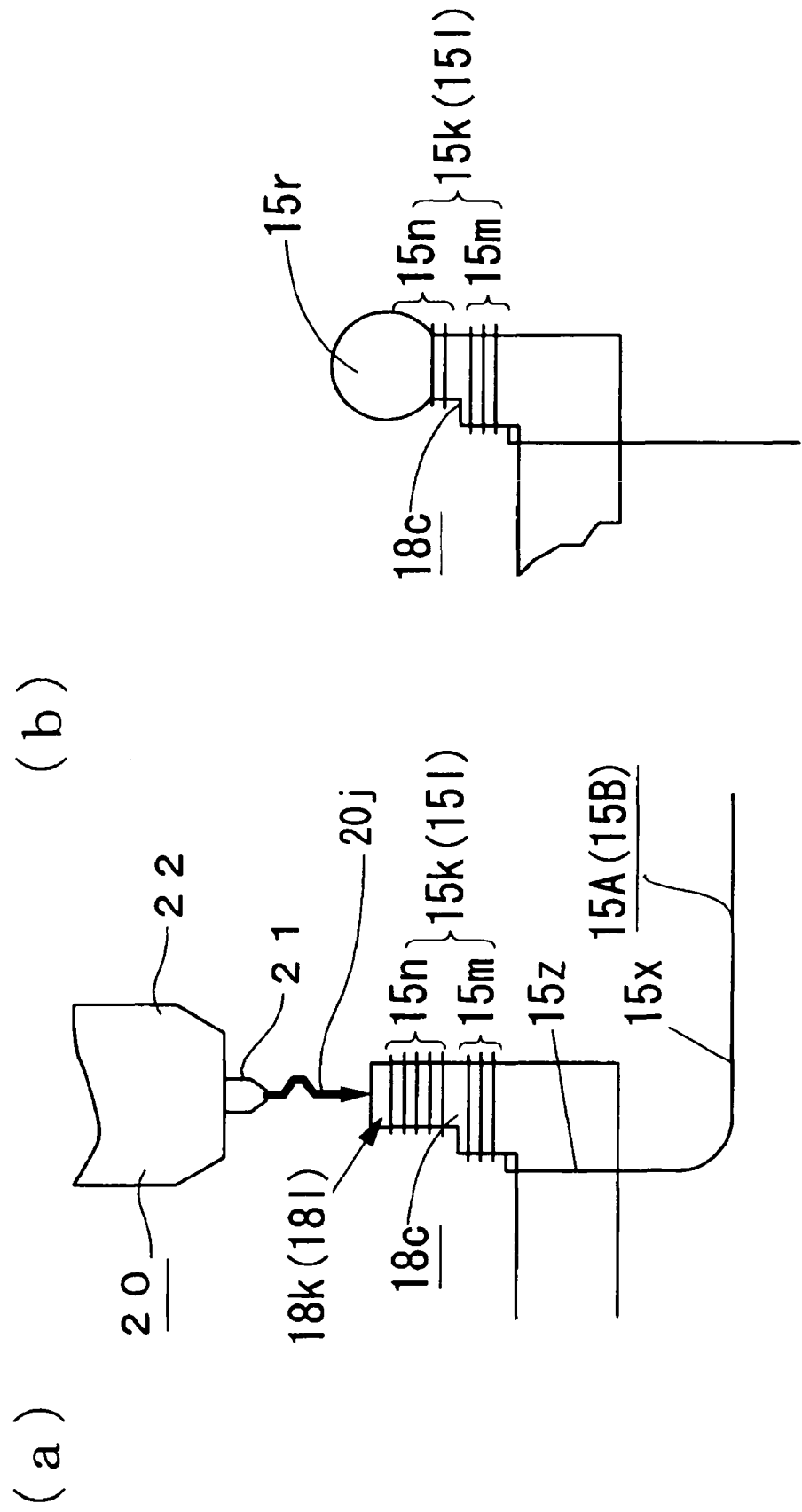
FIG. 3 is a diagram illustrating a welding method of the driving coil.

In FIGS. 3a, 3b, the connection formed by using the tungsten inert gas arc welding is shown.

Referring to the connecting piece 18c of the electric terminal 18A wound around by the end 15k of the coiling pull start section 15A, the winding start section is designated by 15m and the winding finish section including the very end is designated by 15n.

First, as shown in FIG. 3a, the welding end 20 is placed near the upper part of the end 18k of the connecting piece 18c at a location where the distance between the end of the tungsten electrode 21 and the end 18k of the connecting piece 18c is 1 mm. Then, Argon gas is sprayed to the end 18k of the connecting piece 18c through the shield nozzle 22 and, at the same time, the arc current 20j discharges electricity to weld together the end 18k of the connecting piece 18c of the electric terminal 18A and a section of the winding finish section 15n of the end 15k of the coiling pull start section 15A, thereby connecting the electric terminal 18A and the end 15k of the coiling pull start section 15A.

After being welded together, as shown in FIG. 3b, the end 18k of the connecting piece 18c and a section of the winding finish section 15n of the end 15k of the coiling pull start section 15A are integrated and form a welding section 15r with a spherical shape. Accordingly, the connection between the electric terminal 18A and the driving coil 15 becomes more secure. The same technique is applied to establish a connection between the connecting piece 18c of the electric terminal 18B and the end 151 of the coiling pull finish section 15B.

Also, although it is viable to use soldering instead of welding to connect the ends 15k, 151 of the driving coil 15 and the electric terminals 18A, 18B, welding provides a relatively stronger connection. Furthermore, by using soldering, alloy materials may be left inside the device, or flux containing halogen materials may be used. Therefore, it is preferable that welding is employed so as to reduce non-environmental friendly toxic materials in the lens driving device or to enable a halogen-free manufacturing process.

Figure 4:
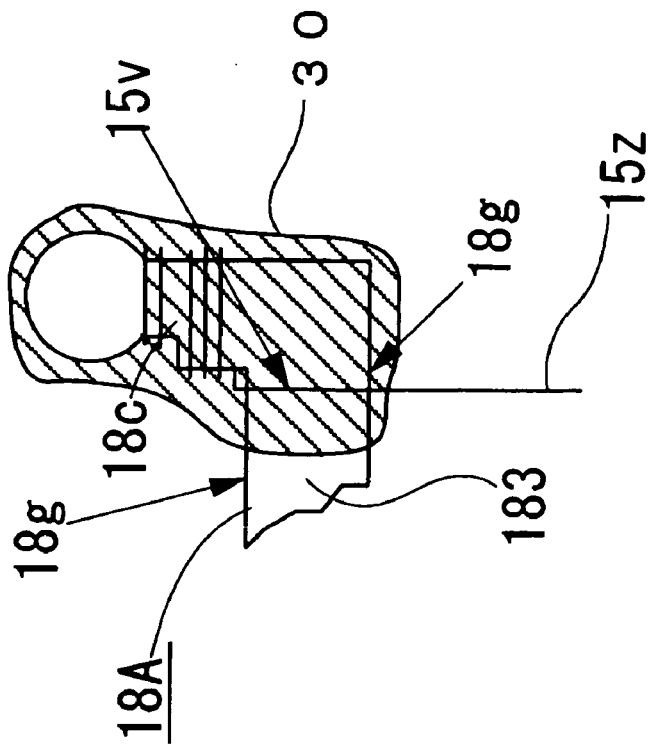
FIG. 4 is a diagram illustrating a method of strengthening the ends of the driving coil.
Figure 4:
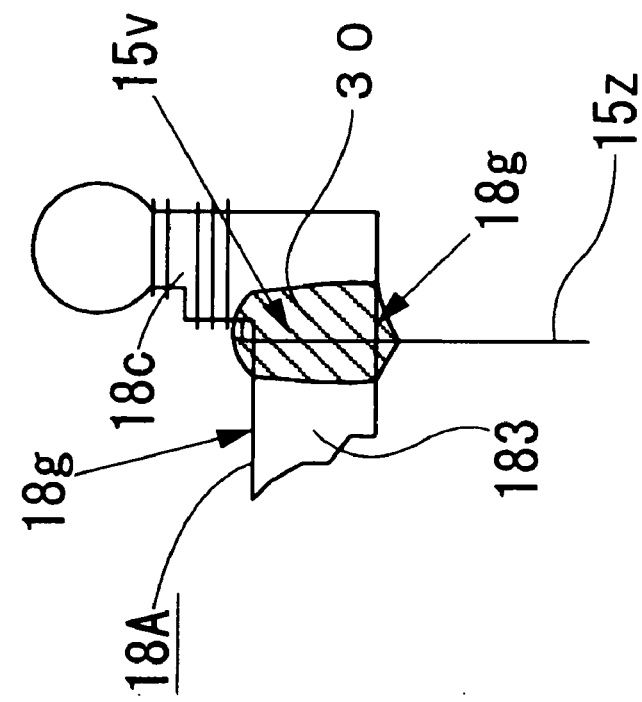

Furthermore, in this embodiment, as shown in FIG. 4a, a soft bonding agent such as resin 30 is used to cover the winding start section 15v of the driving coil 15, the edge section 18g of the connecting piece 18c and the extended piece 183 of the electric terminal 18A and its surrounding surfaces, so as to reinforce the terminal lateral section 15z of the coiling pull start section 15A.

The aforementioned arrangement prevents the occurrence of friction between the terminal lateral section 15z of the coiling pull start section 15A and the edge section 18g at the time when the lens holder 14 is in motion. The repeated friction between the terminal lateral section 15z and the edge section 18g may peel off the coating of the driving coil 15 or even damage the wiring. Therefore, by using resin 30 to cover the winding start section 15v of the driving coil 15 and the edge section 18g, the terminal lateral section 15z will not be in contact with the edge section 18g. Hence, the terminal lateral section 15z will not be damaged.

In addition, as shown in FIG. 4b, resin 30 can also be used to cover the winding start section 15v of the driving coil 15, the connecting piece 18c of the electric terminal 18A, and a section of the extended piece 183.

Figure 5:
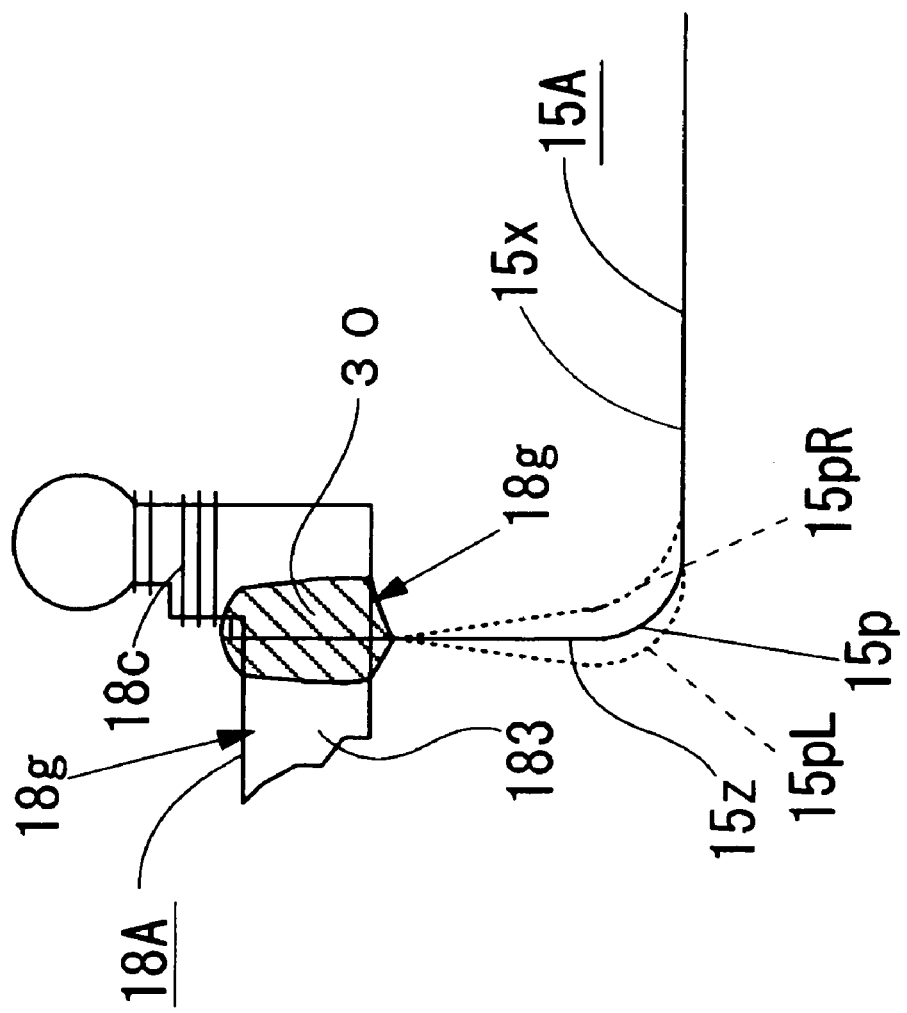
FIG. 5 is a diagram illustrating the flexural movements of the pulled section of the driving coil

Moreover, FIG. 5 shows how the coiling pull start section 15A of the driving coil 15 moves when the driving coil 15 is powered to move the lens holder 14 in the z direction as shown by an arrow in FIG. 1.

Figure 11:
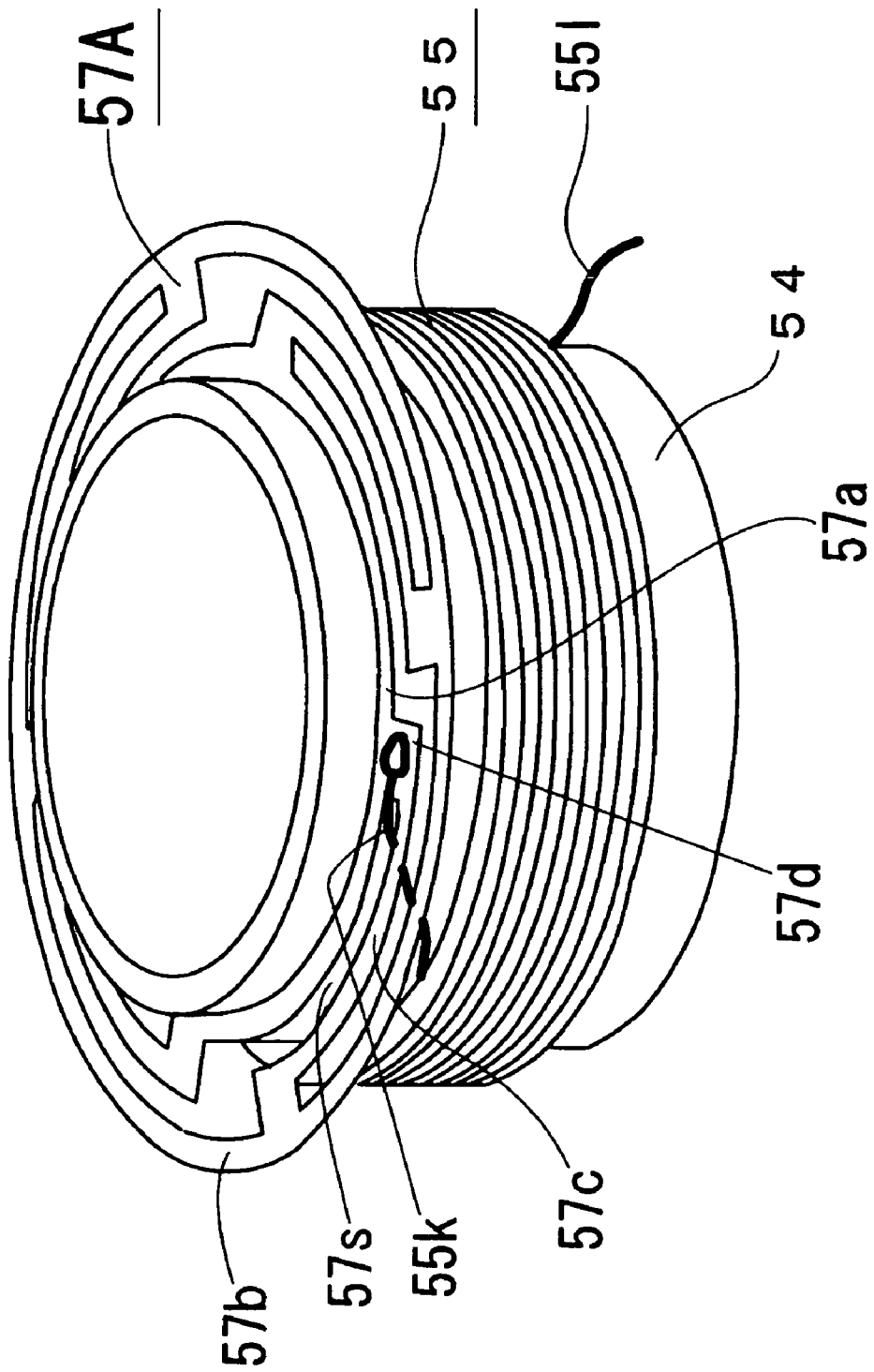
FIG. 11 is a diagram illustrating the prior art connection method of the driving coil.
Figure 12:
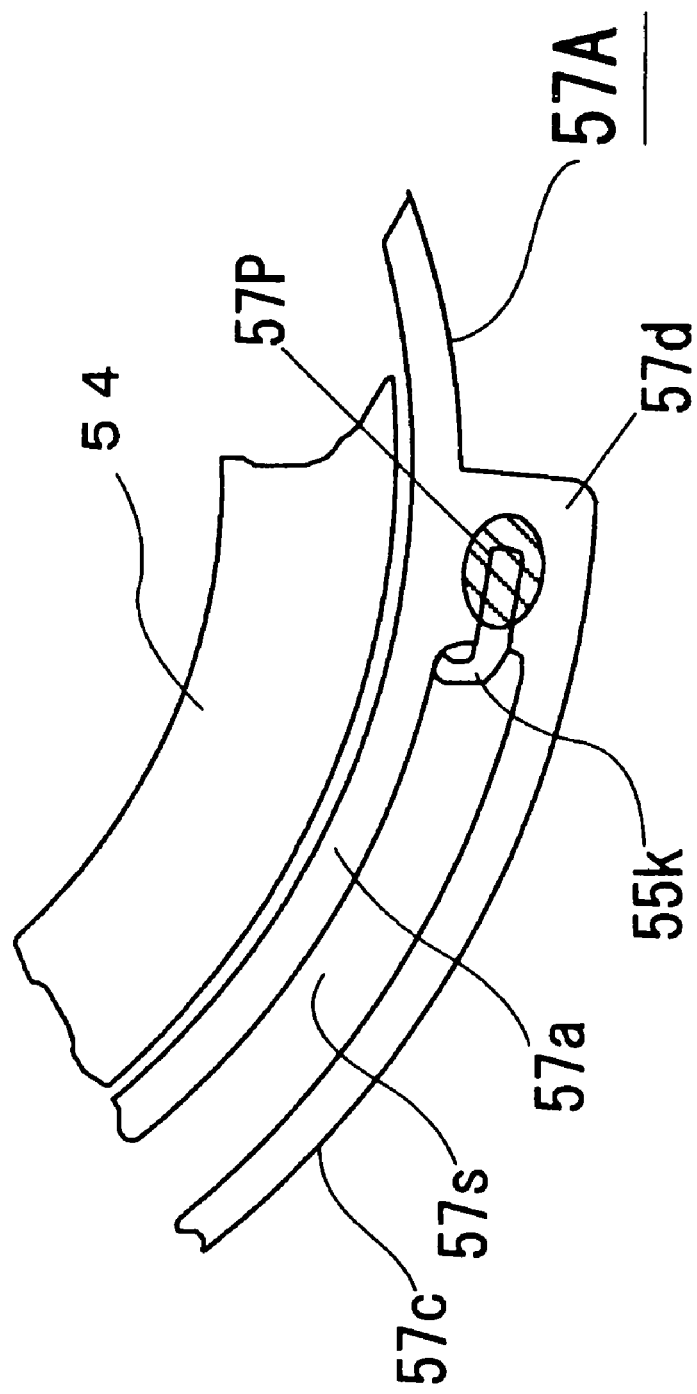
FIG. 12 is an enlarged diagram of the important elements in FIG. 11.

The plate spring members 17 of the lens driving device 10 of the present invention are constructed in similar fashion as the plate spring member 57A shown in FIG. 11, and each of them comprises an inner circular section embedded in the lens holder 14, an outer circular section mounted on the casing 16, and multiple wrist sections that connect the inner and outer circular sections. The multiple wrist sections are in whirling fashion as shown in FIG. 11. The lens holder 14 maintains a suspended state within the casing 16 by means of the multiple wrist sections.

Figure 10:
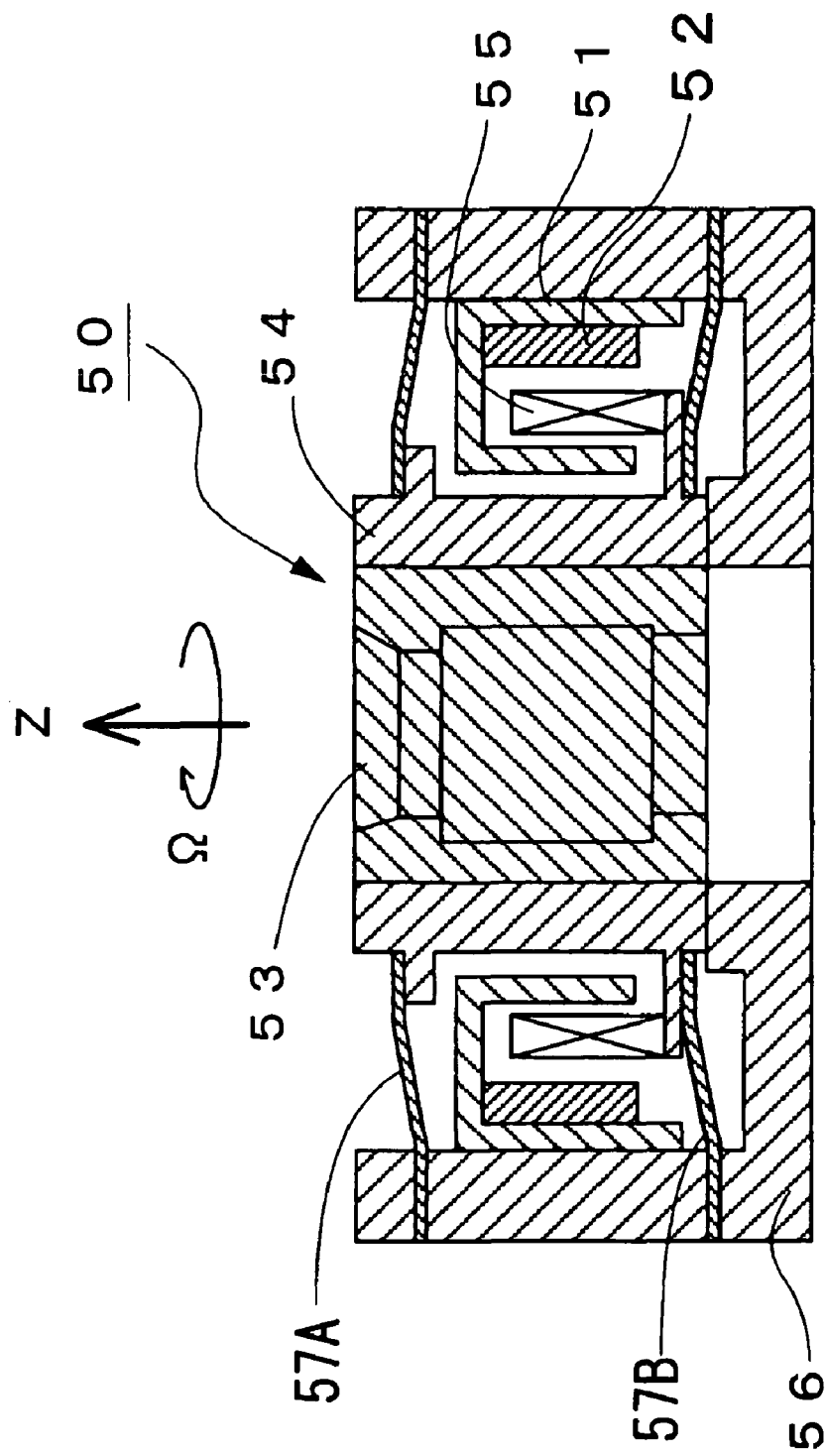
FIG. 10 is a cross-section structural diagram of a prior art lens driving device.

Suppose the electric terminals 18A, 18B, the end 15k of the coiling pull start section 15A, and the end 151 of the coiling pull finish section 15B are connected by straight lines, respectively. When moving in the z direction shown by an arrow in FIG. 1, the lens holder 14 also rotates (the rotation is indicated by a symbol Ω shown in FIG. 10) due to the whirling design of the wrist sections of the plate spring members 17. Thus, as tension exists on the coiling pull start section 15A, the coiling pull finish section 15B will be loosened by compression. The coiling pull start section 15A is the tense end which prevents the lens holder 14 from moving toward the imaged object (+z direction) while the coiling pull finish section 15B is the loosened end which rubs against other nearby parts. Therefore, the lens holder 14 cannot steadily move.

As shown in FIG. 5, in the lens driving device 10 of the present invention, the electric terminals 18A, 18B, the end 15k of the coiling pull start section 15A, and the end 151 of the coiling pull finish section 15B are bent into L shape respectively. The L-shaped coiling pull start section 15A includes a lens holder lateral section 15x extending horizontally and a terminal lateral section 15z extending perpendicularly. Therefore, when pressing force or tension triggered by the rotation of the moving lens holder 14 acts upon the coiling pull start section 15A or the coiling pull finish section 15B, the upward section 15p of the terminal lateral section 15z can flex leftwardly or rightwardly as indicated by 15pL or 15pR in FIG. 5. This means through the leftward and rightward flexure of the upward section 15p of the terminal lateral section 15z, the aforementioned pressing force or tension can be absorbed. Thus, neither the coiling pull start section 15A nor the coiling pull finish section 15B will come in contact with other components, so the lens holder 14 is able to move freely. Hence, the lens holder 14 is able to move steadily in the z direction.

Then, in this embodiment, when the ends 15k, 151 of the driving coil 15 are connected to the electric terminals 18A, 18B mounted on the casing 16, the coiling pull start section 15A of the driving coil 15 starting from the beginning end 15a to the electric terminal 18A and the coiling pull finish section 15B of the driving coil 15 starting from the finish end 15b to the electric terminal 18B are bent into L-like shapes. The L-shaped structure includes a lens holder lateral section 15x extending horizontally and a terminal lateral section 15z extending perpendicularly. Thus, even when the pressing force or tension triggered by the rotation of the moving lens holder 14 acts upon the coiling pull start section 15A or the coiling pull finish section 15B, the aforementioned pressing force or tension can be absorbed. Therefore, the coiling pull start section 15A or the coiling pull finish section 15B will not come in contact with other parts and will not obstruct the movement of the lens holder 14. Thus, the lens holder 14 is able to move steadily in the z direction.

Also, after the end 15k of the coiling pull start section 15A and the end 151 of the coiling pull finish section 15B are wound around the connecting pieces 18c of the electric terminals 18A, 18B, a connection is made by using arc welding. Hence the plate spring members 17 will not be affected, and the electric terminal 18A and the driving coil 15 can be firmly secured together.

In addition, as resin 30 is used to cover the winding start section 15v of the driving coil 15, the edge section 18g of the connecting piece 18c and the extended piece 183 of the electric terminal 18A, and its surrounding surfaces, any possible damage to the driving coil 15 can be successfully avoided.

Figure 6:
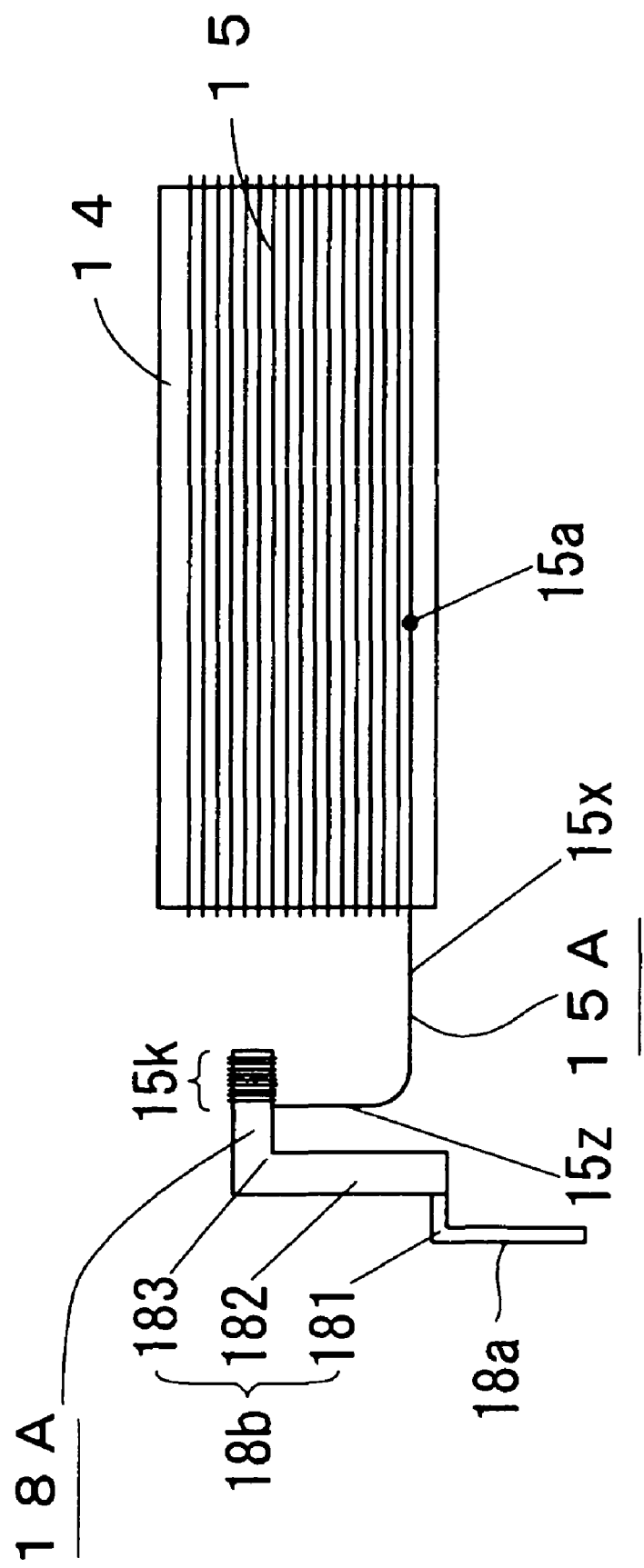
FIG. 6 is a diagram illustrating another connection arrangement between the electric terminals and the ends of the driving coil.

Moreover, in the aforementioned embodiment, each of the electric terminals 18 comprises a flat-plated mounting section 18a, a wrist section 18b including a horizontal piece 181, a perpendicular piece 182, and an extended piece 183, and a connecting piece 18c extending upward from the end of the extended piece 183 of the wrist section 18b. As shown in FIG. 6, each of the electric terminals 18 may not comprise the connecting piece 18c, and the end 15k of the coiling pull start section 15A or the end 151 of the coiling pull finish section 15B is connected with the extended piece 183. Furthermore, the coiling pull start section 15A and the coiling pull finish section 15B can be bent into L-like shapes.

Figure 7:
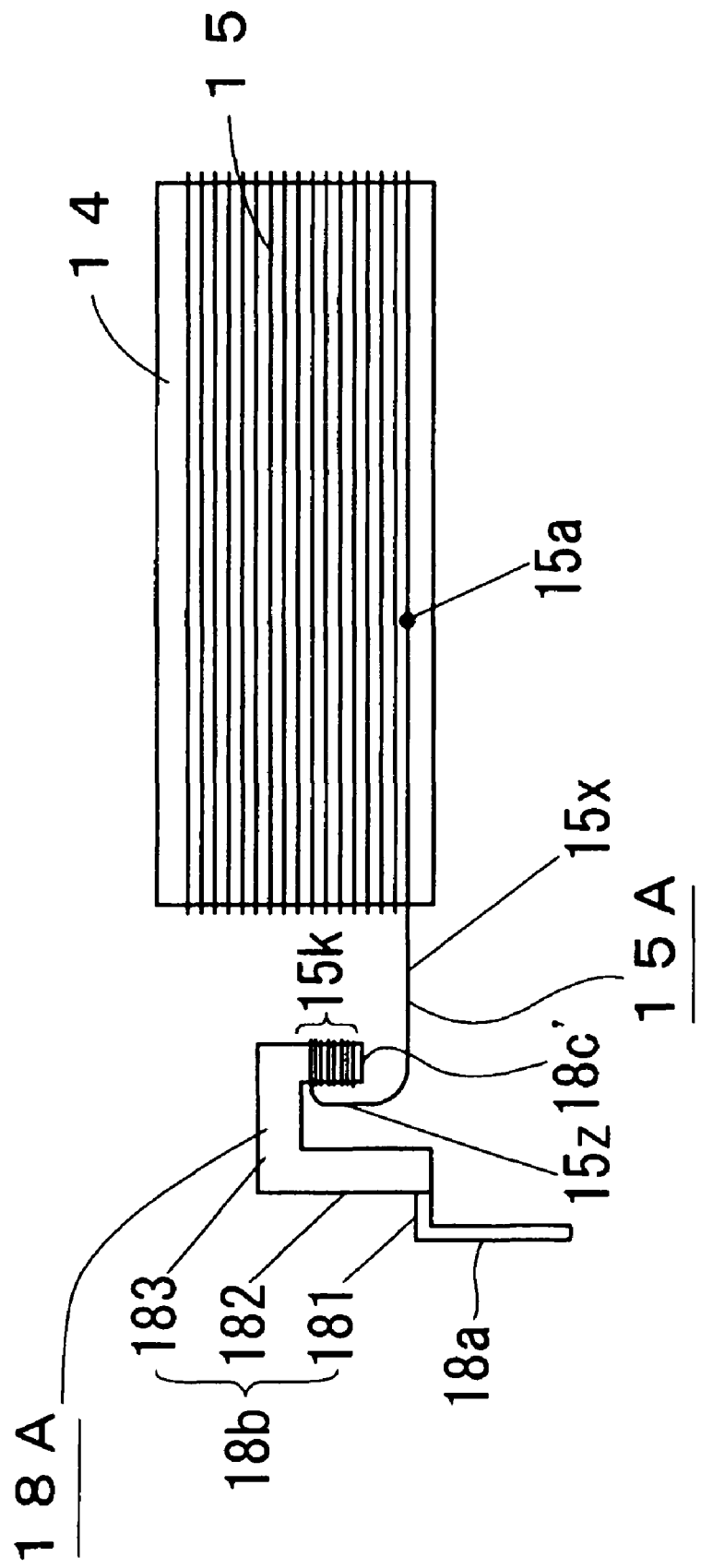
FIG. 7 is a diagram illustrating another connection arrangement between the electric terminals and the ends of the driving coil.

Moreover, as shown in FIG. 7, the connecting piece 18c can be replaced with a connecting piece 18c', which extends downward from the end of the extended piece 183 of the wrist section 18b. In such condition, the coiling pull start section 15A and the coiling pull finish section 15B are shaped like letter J as shown in FIG. 7.

Figure 8:
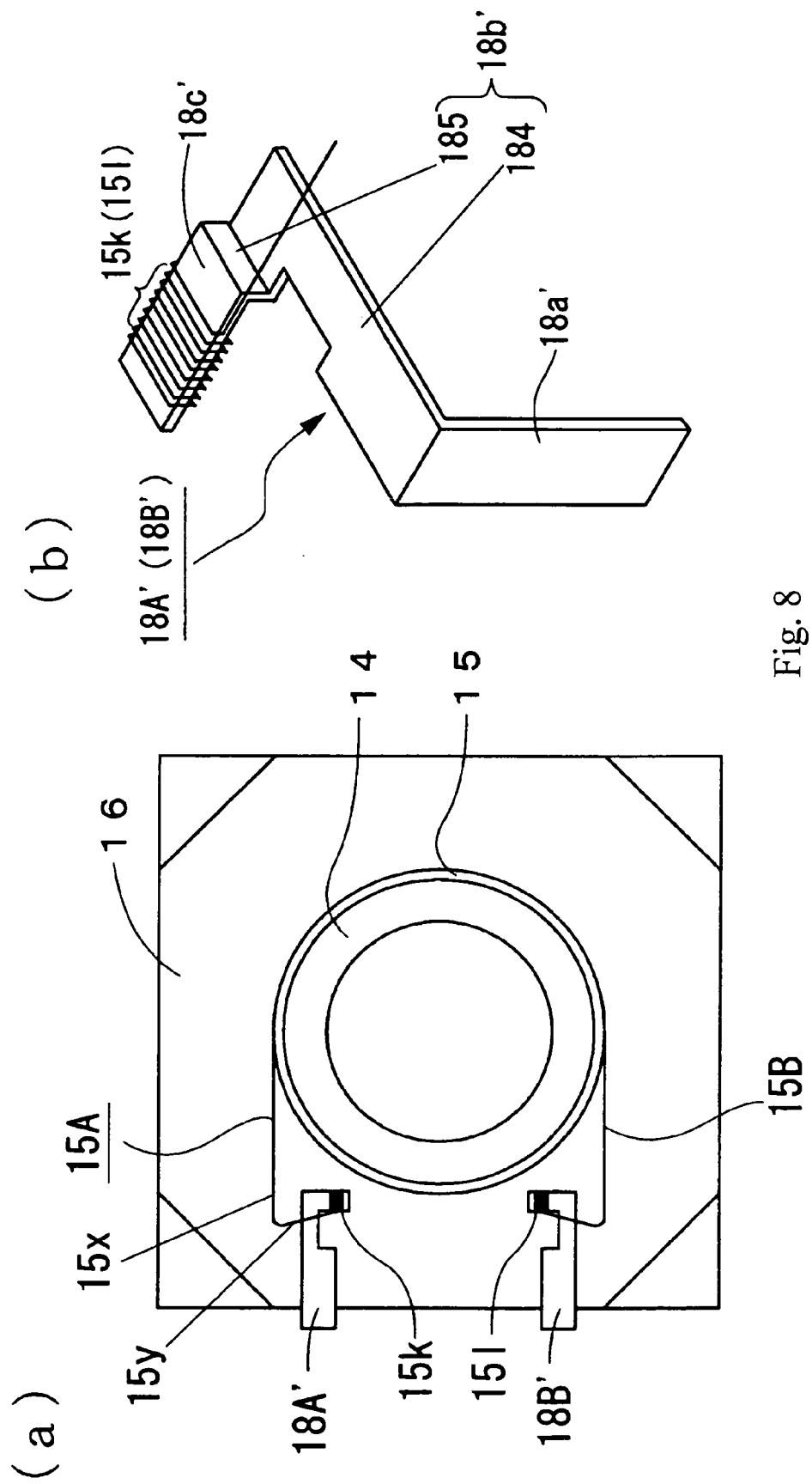
FIG. 8 is a diagram illustrating another connection arrangement between the electric terminals and the ends of the driving coil.

In addition, as shown in FIGS. 2 and 7, the coiling pull start section 15A and the coiling pull finish section 15B are made into L shaped structures. Such L-shaped structure comprises a lens holder lateral section 15x extending horizontally and a terminal lateral section 15z extending in a direction perpendicular to the horizontal plane (the xy plane in FIG. 2). The lens holder lateral section 15x can extend on the horizontal plane or be bent into L-like shape as shown in FIG. 8a. Such L-shaped structure comprises a lens holder lateral section 15x and a terminal lateral section 15y extending in a direction perpendicular to or intersecting with the extending direction of the lens holder lateral section 15x on the horizontal plane.

In such condition, the connecting pieces 18c' of the electric terminals 18A', 18B' as shown in FIG. 8b are connected with the end 15k of the coiling pull start section 15A and the end 151 of the coiling pull finish section 15B respectively. Each of the electric terminals 18A', 18B' comprises a flat-plated mounting section 18a', a wrist section 18b' which includes a horizontal piece 184 and an extended piece 185, and a connecting piece 18c' which is mounted on the end of the extended piece 186 of the wrist section 18b' and extend in a direction parallel to the extending direction of the aforementioned terminal lateral section 15y.

Furthermore, in the aforementioned embodiment, examples as to mutually perpendicular extending directions of the lens holder lateral section 15x and the terminal lateral section 15z are provided. However, as long as the extending directions of the lens holder lateral section 15x and the terminal lateral section 15z intersect, the intersecting angle formed therebetween is not limited to 90 degrees. However, as shown in the embodiment, the mutually perpendicular arrangement of the extending directions of the lens holder lateral section 15x and the terminal lateral section 15z enables an even flexure of the terminal lateral section 15z in respect to pressing force and tension, so that pressing force or tension can be absorbed more effectively.

Figure 9:
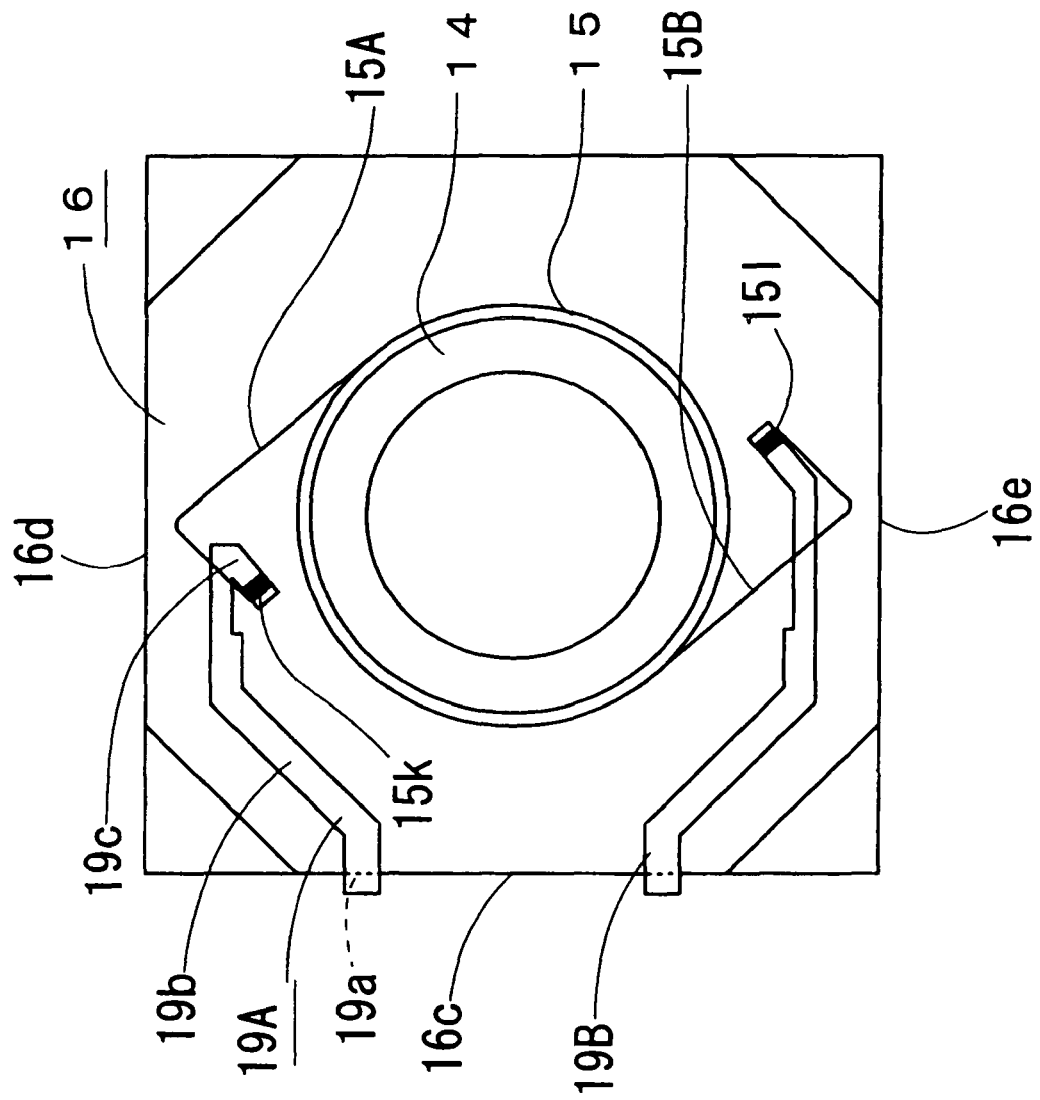
FIG. 9 is a diagram illustrating another connection arrangement between the electric terminals and the ends of the driving coil.

Furthermore, in the aforementioned embodiment, the coiling pull start section 15A and the coiling pull finish section 15B are pulled to the lateral side 16c of the casing 16. However, as shown in FIG. 9, even though the coiling pull start section 15A is pulled to the lateral side 16d of the casing 16 and the coiling pull finish section 15B is pulled to the lateral side 16e opposite to the lateral side 16d, neither the coiling pull start section 15A nor the coiling pull finish section 15B will come in contact with other parts, and the movement of the lens holder 14 will not be obstructed. Thus, it will be the same as the aforementioned embodiment that the lens holder 14 is able to move steadily in the z direction.

In addition, the connecting pieces 19c of the electric terminals 19A, 19B shown in the same figure are connected with the end 15k of the coiling pull start section 15A and the end 15l of the coiling pull finish section 15B respectively. Each of the electric terminals 19A, 19B comprises a flat-plated mounting section 19a, a wrist section 19b whose shape conforms to the inner circumference of the casing 16, and a connecting piece 19c mounted at the end of the wrist section 19b and extending in a direction parallel to the extending direction of the aforementioned terminal lateral section 15y.

The embodiments of the present invention described hereinbefore are exemplary and are not intended to limit the scope of the present invention. It is apparent for those ordinarily skilled in the art that various modifications and alterations may be made to the present invention within the scope and spirit of the appended claims. It is apparent from the claims that the configurations with such modifications and alterations are included in the scope of the present invention.

As described above, the present invention can prevent the ends of the driving coil from being damaged, significantly mitigate the deterioration of the spring members or the melting of the lens holder caused by the heat dissipated from the soldering iron, and enable smooth movement of the lens holder. Therefore, the lens driving device can function stably and have an improved reliability.

What is claimed is:
1. A lens driving device, comprising:
a lens holder as a movable component moving along an axis in an upward-downward direction;
a set of electric terminals installed on multiple fixed side components;
a driving coil installed on an outer sidewall of the lens holder, the ends thereof being connected to the set of electric terminals;
a coiling pull start section of the driving coil starting from a beginning end of the driving coil to one of the set of electric terminals;
a coiling pull finish section of the driving coil starting from a finish end of the driving coil to one of the set of electric terminals;
a lens holder lateral section of the driving coil extending outward horizontally from the beginning or finish end of the driving coil; and
a terminal lateral section of the driving coil extending outward from an end of the lens holder lateral section in a direction intersecting with the extending direction of the lens holder lateral section.

2. The lens driving device according to claim 1, wherein the extending direction of the lens holder lateral section and the extending direction of the terminal lateral section are mutually perpendicular.

3. The lens driving device according to claim 1, wherein an end of the coiling pull start section and an end of the coiling pull finish section of the driving coil are connected to the set of electric terminals by means of welding.

4. The lens driving device according to claim 2, wherein an end of the coiling pull start section and an end of the coiling pull finish section of the driving coil are connected to the set of electric terminals by means of welding.

5. The lens driving device according to claim 1, wherein each of the set of electric terminals comprises a wrist section extending from one of the multiple fixed side components toward the lens holder lateral section and a connecting piece mounted on an end of the wrist section and extending upward in a direction parallel to the extending direction of the terminal lateral section; wherein the ends of the coiling pull start section and coiling pull finish section wind around the connecting pieces.

6. The lens driving device according to claim 2, wherein each of the set of electric terminals comprises a wrist section extending from one of the multiple fixed side components toward the lens holder lateral section and a connecting piece mounted on an end of the wrist section and extending upward in a direction parallel to the extending direction of the terminal lateral section; wherein the ends of the coiling pull start section and coiling pull finish section wind around the connecting pieces.

7. The lens driving device according to claim 3, wherein each of the set of electric terminals comprises a wrist section extending from one of the multiple fixed side components toward the lens holder lateral section and a connecting piece mounted on an end of the wrist section and extending upward in a direction parallel to the extending direction of the terminal lateral section; wherein the ends of the coiling pull start section and coiling pull finish section wind around the connecting pieces.

8. The lens driving device according to claim 4, wherein each of the set of electric terminals comprises a wrist section extending from one of the multiple fixed side components toward the lens holder lateral section and a connecting piece mounted on an end of the wrist section and extending upward in a direction parallel to the extending direction of the terminal lateral section; wherein the ends of the coiling pull start section and coiling pull finish section wind around the connecting pieces.

9. The lens driving device according to claim 5, wherein a winding start section of the coiling pull start section winding around the connecting pieces and the set of electric terminal are covered by resin materials.

10. The lens driving device according to claim 6, wherein a winding start section of the coiling pull start section winding around the connecting pieces and the set of electric terminal are covered by resin materials.

11. The lens driving device according to claim 7, wherein a winding start section of the coiling pull start section winding around the connecting pieces and the set of electric terminal are covered by resin materials.

12. The lens driving device according to claim 8, wherein a winding start section of the coiling pull start section winding around the connecting pieces and the set of electric terminal are covered by resin materials.

* * * * *